(12) United States Patent
Kresse et al.

(10) Patent No.: US 7,359,812 B2
(45) Date of Patent: Apr. 15, 2008

(54) AUTOMATION DEVICE

(75) Inventors: Heiko Kresse, Obernkirchen (DE); Andreas Stelter, Minden (DE); Ralf Schaeffer, Hille (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/519,686

(22) Filed: Sep. 12, 2006

(65) Prior Publication Data

US 2007/0129904 A1    Jun. 7, 2007

(30) Foreign Application Priority Data

Sep. 13, 2005    (DE) ..................... 10 2005 043 480

(51) Int. Cl.
*G01R 29/02* (2006.01)
*H04L 27/00* (2006.01)

(52) U.S. Cl. ........................................ 702/79; 375/256

(58) Field of Classification Search .................. 702/79, 702/81, 122, 125, 182; 375/256; 370/465, 370/498
See application file for complete search history.

(56) References Cited

U.S. PATENT DOCUMENTS 4,104,637 A * 8/1978 Nielson ...................... 342/401
4,521,879 A * 6/1985 Gueldenpfennig et al. .. 370/267

* cited by examiner

*Primary Examiner*—Bryan Bui
(74) *Attorney, Agent, or Firm*—Michael Rickin; Paul Katterle

(57) ABSTRACT

The invention relates to an automation device (100, 100'), in which a multiplicity of physically distributed functional units communicate with each other by means of a common transmission protocol. The device has a microcontroller (110), which is assigned at least one clock generator (120) and one memory unit (150), and which is connected at least to one data source (140), which is designed to output a data bit-stream to be transmitted.

9 Claims, 2 Drawing Sheets

AUTOMATION DEVICE

CROSS REFERENCE TO RELATED APPLICATION

This application claims priority from German Application DE 10 2005 043 480.0 filed on Sep. 13, 2005 the contents of which are relied upon and incorporated herein by reference in their entirety, and the benefit of priority under 35 U.S.C. 119 is hereby claimed.

BACKGROUND OF THE INVENTION

The invention relates to an automation device, with which a multiplicity of physically distributed functional units communicate with each other by means of a common transmission protocol. These functional units manifest themselves as field devices or operator units according to their automation function.

For some time now it has been common practice in instrumentation and control engineering to use a two-wire line to supply a field device and to transfer measurements from this field device to a display device and/or to an automation control system, or transfer control values from an automation control system to the field device. Each measurement or control value is converted into a proportional DC current, which is superimposed on the DC supply current, where the DC current representing the measurement or control value can be a multiple of the DC supply current. Thus the supply current consumption of the field device is usually set to approximately 4 mA, and the dynamic range of the measurement or control value is mapped onto currents between 0 and 16 mA, so that the known 4 to 20 mA current loop can be used.

More recent field devices also feature universal properties that are largely adaptable to the given process. For this purpose, an AC transmission path capable of bi-directional operation is provided in parallel with the unidirectional DC transmission path, via which parameterization data are transferred in the direction to the field device and measurements and status data are transferred from the direction of the field device. The parameterization data and the measurements and status data are modulated on an AC voltage, preferably frequency modulated.

In process control engineering, it is common in the field area as it is called, to arrange and link field devices, i.e. measurement, control and display modules, locally according to the specified safety requirements. These field devices have analog and digital interfaces for data transfer between them, where data transfer takes place via the supply lines of the power supply arranged in the control area. Operator units are also provided in the control area, as it is called, for controlling and diagnosing these field devices remotely, where lower safety requirements normally apply.

Data transfer between the operator units in the control area and the field devices is implemented using FSK modulation (Frequency Shift Keying) superimposed on the known 20 mA current loops, where two frequencies, assigned to the binary states "0" and "1", are transferred in frames as analog signals.

The general conditions for the FSK signal and the type of modulation are specified in the "HART Physical Layer Specification Revision 7.1-Final" dated Jun. 20, 1990 (Rosemount Document no. D8900097; Revision B).

ASICs specifically developed to implement the FSK interface according to the HART protocol, such as the HT2012 from the SMAR company, are commercially available and in common use. The disadvantage with these special circuits is the permanently fixed range of functions and the associated lack of flexibility to adapt to changing requirements.

Known modern automation devices are usually equipped with a processing unit known as a microcontroller, which is used to perform the correct data processing for the automation task of the functional unit concerned.

The aim is to reproduce the functions of the FSK interface according to the HART protocol in the controller of the processing unit of the automation devices, without impairing in the process the automation task of the functional unit concerned.

SUMMARY OF THE INVENTION

Hence the object of the invention is specifically to define an automation device having means for converting a data bit-stream into an FSK signal using a microcontroller known per se.

The invention is based on an automation device having a processing unit, which is assigned at least one memory unit for storing instructions and data. Connected to this processing unit on the transmit side is a digital-to-analog converter whose output is connected to a filter.

Starting from the communications line, the automation device has a cascade circuit comprising means for detecting the zero crossover of the line signal, means for determining the time between two consecutive zero crossovers of the line signal, means for evaluating the time between two consecutive zero crossovers of the line signal, and means for outputting the received data bit-stream as a function of the determined time between two consecutive zero crossovers of the line signal.

To reconstruct the transmitted data bit-stream from the FSK-modulated line signal, the zero crossovers of the line signal are detected, and the time between consecutive zero crossovers measured. The frequency representing the elapsed half-wave is detected from the time interval between two consecutive zero crossovers, and the associated bit value is output.

According to a further feature of the invention, the means for determining the time between two consecutive zero crossovers of the line signal, the means for evaluating the time between two consecutive zero crossovers of the line signal, and the means for outputting the received data bit-stream as a function of the determined time between two consecutive zero crossovers of the line signal, are synchronized together. This cancels out tolerances between two consecutive zero crossovers caused by interference on the line signal.

According to a further feature of the invention, the synchronization is derived from detected zero crossovers, thereby ensuring that the tolerance cancellation is adapted dynamically to the line signal subject to interference.

According to a further feature of the invention, a filter is connected to the input of the means for detecting the zero crossover of the line signal, thereby removing interference signals from the line signal.

BRIEF DESCRIPTION OF THE DRAWINGS

The invention is explained in more detail below with reference to an exemplary embodiment. In the drawings required for this, FIG. 1 shows schematically an automation device 100 to the extent necessary to understand the present invention.

DETAILED DESCRIPTION OF ILLUSTRATIVE EMBODIMENTS

Figure 1:
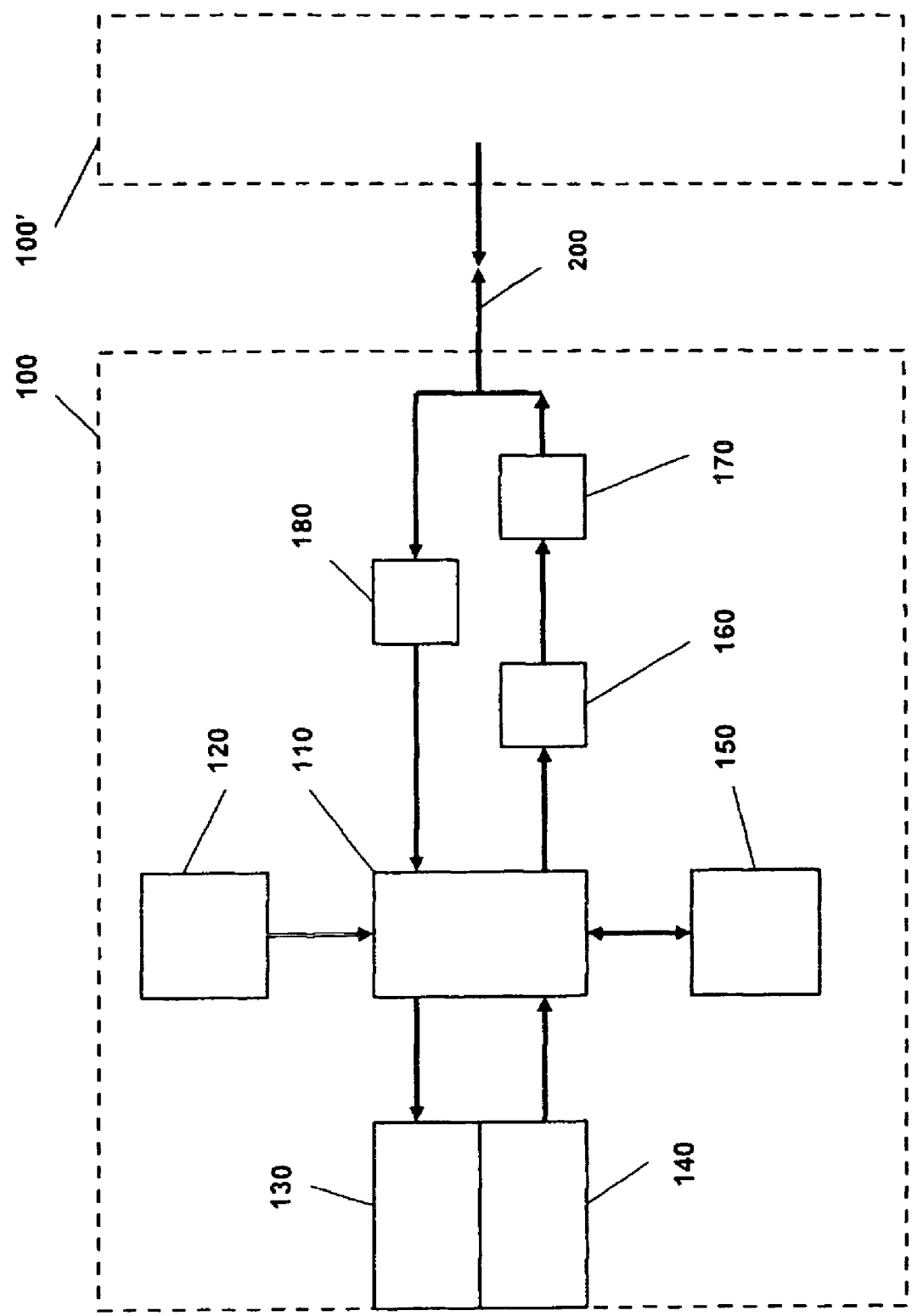
FIG. 1 shows a block diagram of an automation device

The automation device 100 is connected via a communications line 200 to an automation device 100' of substantially the same type. The communications line 200 is used bi-directionally. The information sent by the automation device 100 is received by the automation device 100', and vice versa. Hence reference is only made below to the automation device 100 shown in detail.

A core component of the automation device 100 is a controller 110, which is connected at least to one memory unit 150 and one timing element, referred to below as a clock generator 120 for the sake of simplicity. Usually, however, parts of the clock generator 120 are already implemented in the controller 110.

The controller 110 has connections for connecting a data sink 130 and a data source 140.

A configurable and/or parameterizable sensor for converting a physical variable into an electrical variable can be provided as the data source 140, in which case the configuration and/or parameterization is the data sink 130.

In an alternative embodiment, it can be provided that the data sink 130 is an actuator for converting an electrical variable into a physical variable whose properties can be diagnosed. The diagnostic device provided for this purpose is then the data source 140.

In a further embodiment, it can be provided that the automation device 100 is part of a higher-level device designed for bi-directional communication with additional automation devices 100'. In this embodiment, the higher-level device is both the data source 140 and the data sink 130.

In a further embodiment, the automation device 100 can be designed as a "protocol converter". In this embodiment, the data source 140 and the data sink 130 are formed by a second communications system.

To implement the invention, however, it is sufficient for the data source 140 to be present without the data sink 130.

In addition, connected to the controller 110 is a digital-to-analog converter 160 whose output is connected to a filter 170. The output of the filter 170 is connected to the communications line 200. In addition, the communications line 200 is taken to the input terminals of the controller 110, via which terminals it is provided that the line signal 201 on the communications line 200 is received.

Figure 2:
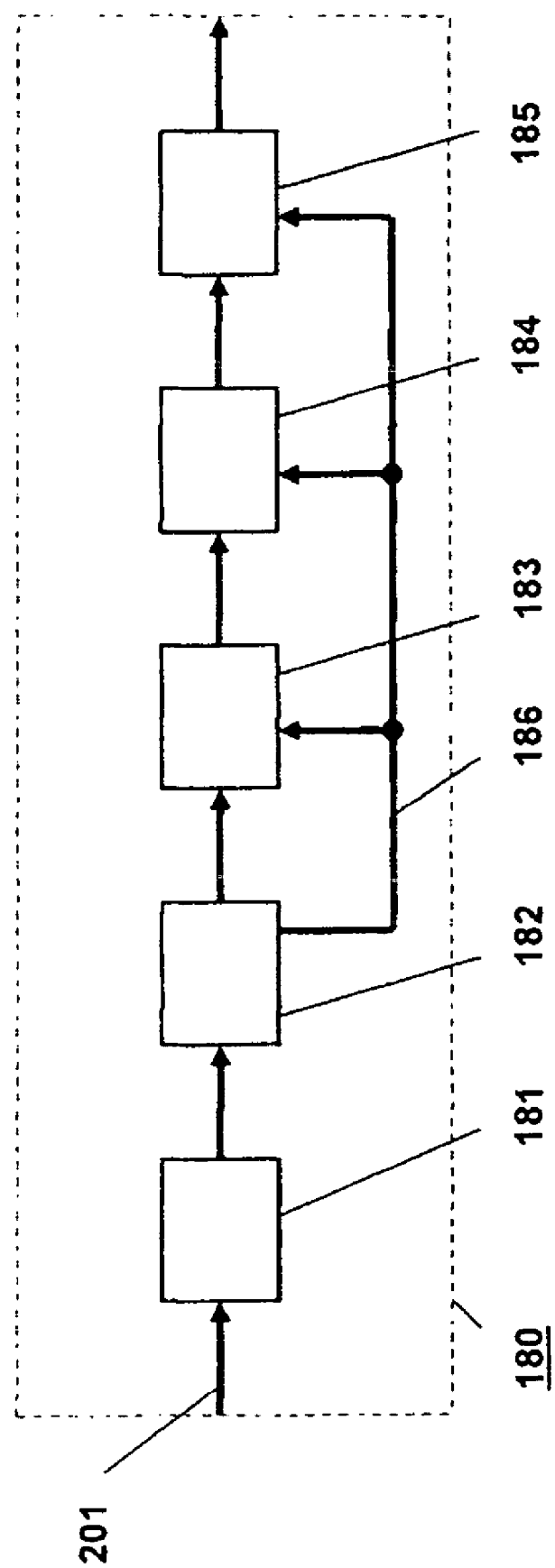
FIG. 2 shows a schematic diagram for converting an FSK signal into a data bit-stream

Starting from the communications line 200, the automation device has a demodulation device 180 at the receive end. A demodulation device 180 is shown schematically in FIG. 2, where the same references are used for the same means.

The demodulation device 180 has a cascade circuit comprising a zero-crossover detector 182 for detecting the zero crossover of the line signal 201, a timer 183 for determining the time between two consecutive zero crossovers of the line signal 201, a decision circuit 184 for evaluating the time between two consecutive zero crossovers of the line signal 201, and an output stage 185 for outputting the received data bit-stream as a function of the determined time between two consecutive zero crossovers of the line signal 201.

To reconstruct the transmitted data bit-stream from the FSK-modulated line signal 201, the zero crossovers of the line signal 201 are detected, and the time between two consecutive zero crossovers measured. The frequency representing the elapsed half-wave is detected from the time interval between two consecutive zero crossovers, and the associated bit value output.

For an FSK-modulated line signal 201, the mean value of the half-period of the first frequency and the half-period of the second frequency is defined as the measurement time. If another zero crossover of the line signal 201 is detected within the measurement time, the associated bit value is output. If no further zero crossover of the line signal 201 is detected within the measurement time, the associated inverse bit value is output.

In a further embodiment of the invention, the zero-crossover detector 182, the timer 183 and the decision circuit 184 are synchronized together, and connected by a synchronization line 186.

According to a further feature of the invention, the synchronization is derived from detected zero crossovers. For this purpose, the synchronization line 186 is supplied from the zero-crossover detector 182.

According to a further feature of the invention, a filter 181 is connected to the input of the zero-crossover detector 182, thereby removing interference signals from the line signal.

What is claimed is:

1. An automation device, with which a multiplicity of physically distributed functional units communicate with each other by means of a common transmission protocol, the automation device comprising:
    a microcontroller, which is assigned at least one clock generator and one memory unit, and which is connected at least to one data source, which is designed to output a received data bit-stream, and to which is input an FSK-modulated line signal in which a first frequency represents a first bit value and a second frequency represents a second value,
    a cascade circuit connected between a communications line (200) and the microcontroller, said cascade circuit comprising
        means (182) for detecting the zero crossover of the line signal (201),
        means (183) for determining the time between two consecutive zero crossovers of the line signal (201),
        means (184) for evaluating the determined time between two consecutive zero crossovers of the line signal (201) by comparing the determined time to a measurement time, the measurement time being derived from a half-period of the first frequency and a half-period of the second frequency, and
        means (185) for outputting the first bit value if the determined time is within the measurement time and outputting the second bit value if the determined time is not within the measurement time.

2. The automation device as claimed in claim 1, wherein the means (183) for determining the time between two consecutive zero crossovers of the line signal (201), the means (184) for evaluating the time between two consecutive zero crossovers of the line signal (201), and the means (185) for outputting, are synchronized together.

3. The automation device as claimed in claim 1, wherein the synchronization is derived from detected zero crossovers.

4. The automation device as claimed in claim 1, wherein a filter (181) is connected to the input of the means (182) for detecting the zero crossover of the line signal (201).

5. The automation device of claim 1, wherein the measurement time is the mean value of the half-period of the first frequency and the half-period of the second frequency.

6. An automation device for connection to a communications line over which a FSK-modulated line signal is transmitted, wherein a first frequency of the line signal represents a first bit value and a second frequency of the line signal represents a second bit value, the automation device comprising:
 memory;
 a clock generator;
 a controller connected to the memory and the clock generator; and
 a demodulation device connected between the controller and the communications line, the demodulation device comprising a zero crossover detector, a timer and decision circuitry, the demodulation device being operable to determine the time between two consecutive zero crossovers of the line signal and to compare the determined time to a measurement time, the measurement time being derived from a half-period of the first frequency and a half-period of the second frequency, and wherein the demodulation device outputs the first bit value if the determined time is within the measurement time end outputs the second bit value if the determined time is not within the measurement time.

7. The automation device of claim 6, wherein the measurement time is the mean value of the half-period of the first frequency and the half-period of the second frequency.

8. The automation device of claim 6, wherein the zero crossover detector, the timer and the decision circuit are synchronized together and are each connected to a synchronization line.

9. The automation device of claim 8, wherein the synchronization line is supplied from the zero crossover detector and the synchronization of the zero crossover detector, the timer and the decision circuit is derived from detected zero crossovers.

* * * * *